(12) United States Patent
Breuer et al.

(10) Patent No.: US 11,909,518 B2
(45) Date of Patent: Feb. 20, 2024

(54) METHOD FOR SECURING A COMMUNICATION USER EQUIPMENT FROM A JAMMING ATTACK

(71) Applicant: Telit Cinterion Deutschland GmbH, Munich (DE)

(72) Inventors: Volker Breuer, Boetzow (DE); Bernd Rohl, Munich (DE)

(73) Assignee: Telit Cinterion Deutschland GmbH, Munich (DE)

( * ) Notice: Subject to any disclaimer, the term of this patent is extended or adjusted under 35 U.S.C. 154(b) by 332 days.

(21) Appl. No.: 17/415,230

(22) PCT Filed: Dec. 13, 2019

(86) PCT No.: PCT/EP2019/085192
§ 371 (c)(1),
(2) Date: Jun. 17, 2021

(87) PCT Pub. No.: WO2020/126943
PCT Pub. Date: Jun. 25, 2020

(65) Prior Publication Data
US 2022/0069936 A1 Mar. 3, 2022

(30) Foreign Application Priority Data
Dec. 18, 2018 (EP) .................... 18213637

(51) Int. Cl.
*H04K 3/00* (2006.01)
*H04W 12/122* (2021.01)
(52) U.S. Cl.
CPC ............ *H04K 3/226* (2013.01); *H04K 3/65* (2013.01); *H04W 12/122* (2021.01); *H04K 2203/16* (2013.01)

(58) Field of Classification Search
CPC ...... H04K 3/226; H04K 3/65; H04K 2203/16; H04W 12/122
See application file for complete search history.

(56) References Cited

U.S. PATENT DOCUMENTS

2019/0132074 A1* 5/2019 Breuer .................. H04K 3/88
2021/0211917 A1* 7/2021 Kunz .................. H04W 48/20

FOREIGN PATENT DOCUMENTS

| AU | 2015213426 | 9/2015 |
| BR | 102016010331 | 11/2016 |

(Continued)

OTHER PUBLICATIONS

International Search Report (PCT/ISA/210) and Written Opinion (PCT/ISA/237) dated Feb. 13, 2020, by the European Patent Office as the International Searching Authority for International Application No. PCT/EP2019/085192.

(Continued)

*Primary Examiner* — Natasha W Cosme
(74) *Attorney, Agent, or Firm* — PEARL COHEN ZEDEK LATZER BARATZ LLP

(57) ABSTRACT

A method for a user equipment operating in a cellular network having a plurality of base stations, the user equipment operating on at least one of the base stations, hereinafter the serving base station, for the case of a communication loss to its serving base station, whereby the conditions relating to the serving base station or the corresponding frequency fulfills the criteria concerning jamming. The method includes the steps of: scanning for accessible base stations of the cellular network, examining the at least one base station being identified through the scanning step, by means of signalling message, evaluating the response behavior of the at least one base station, wherein in consideration of the response behavior of at least one of said base station (Continued)

if said base station is rated as suspicious: indicating a jamming situation, otherwise camping on at least one of the base stations.

13 Claims, 2 Drawing Sheets

(56) References Cited

FOREIGN PATENT DOCUMENTS

| | | |
|---|---|---|
| CN | 101102556 | 1/2008 |
| CN | 101282553 | 10/2008 |
| EP | 1917750 B1 | 4/2010 |
| EP | 2920886 B1 | 1/2017 |
| EP | 3258719 A1 | 12/2017 |
| EP | 3224974 B1 | 9/2018 |
| JP | 2011517186 A | 5/2011 |
| JP | 2013078061 A | 4/2013 |
| JP | 2015521435 | 7/2015 |
| JP | 2016511614 | 4/2016 |
| WO | 2011084595 A1 | 7/2011 |

OTHER PUBLICATIONS

Examination Report from JP Patent Office for co-pending patent Application N°JP2021-535142 and English translation (6 pages).

* cited by examiner

METHOD FOR SECURING A COMMUNICATION USER EQUIPMENT FROM A JAMMING ATTACK

CROSS-REFERENCE TO RELATED APPLICATIONS

This application is a National Phase Application of PCT International Application No. PCT/EP2019/085192, International Filing Date Dec. 13, 2019, claiming the benefit of European Patent Application No. 18213637.4, filed Dec. 18, 2018, which are hereby incorporated by reference in their entirety.

FIELD OF THE INVENTION

The present invention relates to a method for a user equipment operating in a cellular network. The invention also pertains to a user equipment using said method.

BACKGROUND OF THE INVENTION

Generally, in the field of wireless communication it is known that attackers have the chance to attack the air interface and inhibit any communication between a user equipment and a base station of a cellular network for wireless communication.

Meanwhile a couple of methods have been developed and implemented on the user equipment side that detect the jamming situation quite quickly. A couple of such methods are known from e.g. EP1917750B1, EP2920886B1 and EP3224974B1.

Meanwhile attackers have however created a new strategy, based on the knowledge that many user equipments nowadays provide jamming detection features.

Consequently the jammers are only selectively active on the frequency range of one or a few base stations in a certain area. Additionally a dummy transmitting station is setup which e.g. does nothing else as broadcasting signals, that pretend that this is a neighbor base station of the jammed base station. And said base station would be suitable to start communication with.

However, such a base station would be considered as not being jammed as the broadcast can be received without problems. Such broadcasting can even simply be recorded previously.

For a user equipment with jamming detection capability this then looks as if a unjammed base station is around. Jamming detection first looks for a user equipment like a connection loss. Irrespective of the reason for that connection loss, a user equipment might in response to camp on another base station.

When such dummy transmitting station is sufficiently close to the user equipment—e.g. when it is part of a theft-protection installation for a car, or a burglary protection for a house, then the attacker would probably setup such dummy transmitting station close to the target object—then the user equipment would receive the broadcast and believe to have found an unjammed base station, which additionally is the most suitable base station with a high likelihood.

This would prevent it from making a jamming indication, like activating the horn or calling security staff.

The easiest way to setup such a base station would be recording the broadcast of a real base station and transmitting said recorded broadcast by means of a dummy transmitting station, which claims to be a base station.

Furthermore the dummy transmitting station also could indicate being from the same PLMN or containing a list of valid PLMNs being allowed to access, giving capabilities of System Information to carry such information. It is clear that any public network within a country could be contained within said list. So any user equipment could try to access that dummy transmitting station which behaves like a regular base station.

In response to a user equipment request such station may not answer at all, or send randomly reject message to the requesting user equipments. Hence a conjunction jamming detection enabled user equipment would not consider this to be a jammed base station, but would just try further attempts in dependence of the replies received from that dummy transmitting. Hence a conventional user equipment would not activate a jamming detection at all.

To make the next step to overcome this new strategy it requires means for the user equipment to foresee such situation and be able to reliably detect a jamming situation despite the available dummy transmitting station.

It is therefore the goal of present invention to propose a solution for an improved jamming detection of the user equipment overcoming the new attack strategy.

Further alternative and advantageous solutions would, accordingly, be desirable in the art.

SUMMARY OF THE INVENTION

It is according to a first aspect of the invention suggested a method for a user equipment according to claim 1. It is further suggested according to a second aspect of the invention a user equipment according to claim 10.

According to the first aspect of the invention it is proposed a method for a user equipment operating in a cellular network comprising a plurality of base stations, the user equipment operating on at least one of the base stations, hereinafter the serving base station, for the case of a communication loss to its serving base station, whereby the conditions relating to the serving base station or the corresponding frequency fulfills the criteria concerning jamming, the method comprises the steps of:
  scanning for accessible base stations of the cellular network,
  examining the at least one base station being identified through the scanning step, by means of signalling message,
  evaluating the response behavior of said at least one base station,
  wherein in consideration of the response behavior of at least one of said base station if said base station is rated as suspicious:
  indicating a jamming situation, otherwise camping on at least one of said base stations.

The inventive method relates to a user equipment being capable of operating with a base station of a cellular network for wireless communication, in particular those implementing the wireless technology standards of 2G, 3G (UMTS), 4G (LTE), 5G (New Radio) or beyond.

The user equipment is expected to camp on a cell resp. base station of the cellular network. Depending upon the technology standard of the base station, it is called BS, NodeB, eNB, gNB. In the following it is named base station without limiting to a certain technology.

When a user equipment camps on a base station, either in connected or idle mode or other modes, it expects to receive signals from the base station. In idle mode and to some limited extend in dedicated mode the user equipment receives general messages. Such signals are in particular in the broadcast channel BCH, in particular the system information. Said information indicates how to access the base station, corresponding limitations and required information or updates concerning said information. Besides broadcast signals the user equipment also regularly listens to reference signals being also part of the continuous base station emissions which also can be used to rate the quality of said serving base station.

In case of a running connection it is additionally communicated via dedicated downlink channels.

Basically, a user equipment is repeatedly listening to signals from the base station. In case of a communication loss however it needs to take measures. However such communication loss may have various reasons. One reason is to be moved in an out of coverage area. This may in particular be the case when entering a parking garage or basement of a house.

Another reason might be that a jammer is disturbing the frequency area used by the base station, in particular for downlink communication. A jammer is a device that emits white noise with high energy on certain frequency ranges. The attacker establishing such a jammer typically do so in order to bring certain user equipments out of service, in particular security related user equipments like a part of theft protection equipment for a car or home security installations. In the recent years a couple of methods were developed that allow identifying if a communication loss is due to a jammer or due to other reasons.

In particular such methods are based on the fact, that the energy in the respective frequency band is comparably high, and masks the base station signals, and hence no decoding of the base station signals is possible. When these conditions relating to the serving base station, resp. the signals retrieved from the serving base station, and/or the energy relating to the respective frequency range of the serving base station are fulfilled, the user equipment may identify a jamming condition.

The energy in the band should be sufficient to decode but no sensible data can be found within said frequency range. Upon detection such a situation the user equipment may search for other base stations, as also due to momentary disturbances such situations may occur.

In case the user equipment is capable of detecting a jamming situation, then the attacker might install a dummy transmitting station close to the addressed base station. Such a dummy transmitting station in particular emits signals which shall have the user equipment believe that this is a regular base station where the user equipment can camp on. There are simple implementations of such a dummy transmitting thinkable, in particular one, that simply broadcasts the signals of another base station.

Other more elaborate implementation lead more in the direction of a fake base station, which can answer on requests from the user equipment.

To summarize, the dummy transmitting station is equipped that way that it lets the user equipment believe that a regular base station is available, after a communication loss was detected. For that the dummy transmitting station obviously needs to use other frequency ranges than those affected by the jammer.

When a communication loss is detected, the invention method suggests for the user equipment to scan for accessible base stations of the cellular network. This is in particular a typical operation carried out regularly by a user equipment in order to find more suitable base stations also on other frequencies. The result is a list of suitable, that means in particular decodable, base stations.

Should no such base station appear, then—in case a jamming was identified
the normal procedure of indicating a jamming situation would be carried out.

This is the situation of only a jammer in proximity of the user equipment, but no dummy transmitting station.

In contrast, when signals of at least one base station—resp. the signals of a dummy transmitting station—are received, then for all such base station the following evaluation steps are carried out in order to find out if such signals are from real reliable base stations or from a dummy transmitting station.

For a regular user equipment despite a possible jamming situation the availability of a decodable base station prevents from sending a jamming indication, as there is a way of continuing working.

Hence the user equipment carries out the step of examining at least one, in particular each of the list of base stations, which were identified through the step of scanning. Part of this examining is sending of a signalling message to the respective base station.

Such signalling message is in particular a RACH message, which is normally anyhow the first message for getting into contact with the base station. The RACH message is dedicated to start the RACH process, known in particular for LTE, with that the user equipment can achieve a timing synchronization and then request resources to be granted by the base station for setting up a communication.

After sending the signalling message, the response behavior is evaluated in order to figure out if the inspected candidate base station is rated as suspicious or not.

When the base station is rated as suspicious this means that the user equipment believes this to be a dummy transmitting station. Consequently it wants to refrain from continuing communication with said dummy transmitting station.

Additionally when a dummy transmitting station is detected, then the user equipment revealed that an attack is happening. Consequently the indication of a jamming situation needs to be carried out.

Depending upon the type of user equipment such indication of a jamming situation might vary. E.g. for a car to activate the horn is a possible indication. For home security installations activating light, or sending an alarm message, in particular over a second channel (like Wifi, landline network) to an alarm center would be the common actions carried out in case of detection of a jamming situation.

For other user equipments, e.g. a normal handset, a regular information with a warning signal on the screen might be good enough. Other user equipments are simply deactivated in order to avoid further harm.

In case the at least one base station is not identified as being suspicious then the user equipment might decide to camp on said base station, in particular provided that other condition, in particular sufficient suitability and the correct access rights/subscription (not a LTE cell with a 3G-only SIM-card) are available.

As it can be seen, the suggested method is advantageous as it solves seamlessly the envisaged task without too much overload for the user equipment. Further it advantageously enhances the jamming detection algorithm implemented in the user equipment.

In an advantageous embodiment it is proposed that rating the response behavior of a base station as suspicious comprises not answering on said signalling message.

According to this embodiment the response behavior comprises that no answer at all is retrieved from the candidate base station. In particular when this happens repeatedly, this is a strong indication that the signals are coming from a dummy transmitting station which is doing nothing else than transmitting a recorded broadcast.

Hence the candidate base station is rated as suspicious and this leads to the result of indicating a jamming situation.

In another advantageous embodiment it is proposed that said base station is rated as suspicious in case of detecting a transmission of at least one of a barring indication or a restriction for operator use indication.

According to this embodiment a more elaborate dummy transmitting station is determined. Such dummy transmitting station has available a specially prepared broadcast. With that prepared broadcast certain information are transmitted that makes the user equipment believe, that it is not able to access this base station for the time being, but possibly later.

Such information is in particular a field indicating a barring situation of the base station, be it for all user equipments or a subset of them. Preferably such indication is submitted in the system information block 1 (SIB1).

This barring is in particular known for high congestion situations. Additionally as part of the Extended Access Barring (EAP) this might related to a selective barring of certain device types, in particular Machine-Type-Communication (MTC) user equipments.

Another option is an indication relating to a restriction for operator use. This is another type of barring, where for certain access classes, in particular emergency cases, access to the base station is allowed, however not for a regular device in regular communication.

As both SIB-fields are valid fields, normally there is nothing suspicious with it. However in the circumstances of identifying a jamming situation and being able to detect preferably only one base station, which however is barred from accessing, this is reason enough to rate this base station as suspicious.

In another advantageous embodiment it is proposed that said signalling message is a connection attempt, and rating the response behavior of a base station as suspicious comprises detecting of rejecting a plurality of connection attempts.

With this embodiment another more elaborate type of dummy transmitting station is addressed. This is able to receive signaling messages from the user equipment and respond to it. This could as such incline the user equipment to trust such a base station. However as part of this advantageous embodiment the response to a signalling message is evaluated. When the response repeatedly comprises a rejection, then this raises doubts again.

In particular the rejection message is a RACH congestion indication, where the base station indicates a collision of too many parallel RACH requests. Alternatively or additionally the rejection message is a RACH reject message (immediate assignment reject), wherein in the RACH process no resources, in particular as part of Message 4 of the regular 4-step-RACH process, are claimed to be available.

If this is in particular repeatedly detected then this is suspicious. Normally a user equipment is expected to make the RACH request later again, with increasing time gap after the latest unsuccessful RACH request. At least after a predetermined number of RACH request with repeatedly the same reject response it is to assume that a dummy transmitting station is detected instead of a real base station.

In any case, with the inventive method the jamming detection enabled user equipment will consider such subsequent rejects of such a cell as a dummy transmitting station, deployed to circumvent jamming alarm, and make the alarm anyway.

According to another preferred embodiment it is proposed that the user equipment further maintains a base station list, and the method comprising the steps of:

storing in said base station list an indication relating to a base station in conjunction with a successful operation on said base station, wherein the evaluated base station is not rated as suspicious when the base station list contains an indication relating to said base station.

This embodiment enhances the evaluation of base stations by means of a whitelist. When a base station was already visited by the user equipment and the communication with that base station was successfully carried out, then this base station may be seen as a reliable base station instead of a dummy transmitting station.

Hence it is proposed that the user equipment maintains a base station list comprising indications relating to base stations. Such indications are entered into the list, when a successfully operation on said base station was carried out. Such successful operation in particular is to successfully camp on a base station, make a connection to a communication endpoint, like another user equipment or a server accessible via internet.

Alternatively a successful operation comprises that said base station was contained in neighbor cell information being provided by the current serving base station, which forms a chain of trust.

When in the situation of the user equipment after a connection loss the identified base station is part of that list, than it can with high likelihood be evaluated as not suspicious.

This is in particular helpful for situations of high congestion, e.g. at 31. December short before 12 p.m. The congestion at that time might lead to rejection of RACH request due to the expected high load. This is intended not to be identified as a jamming situation. For that the indication in the base station list is helpful for discrimination real congestion from fake congestion. In particular said step of storing indications in said base station list is triggered by an event determined by the user equipment of being momentary stationary. With this advantageous embodiment it is assured that the whitelist does not get too overcrowded and require too much time to evaluate the whitelist.

Consequently it is proposed that only when the user equipment detects that it is operating stationary that an indication of the base station where the user equipment is currently successfully operating with is stored in the base station list.

Some user equipments are operating permanently stationary, like metering, home security devices which are fixed installed in a building. In such case no special triggering event is needed, as the user equipment is aware of being stationary. This can additionally be activated in the user equipment.

For other user equipments however it might be needed to detect a momentary stationary behavior. This is in particular the case for user equipments installed in a car. E.g. when the theft protection is activated, then the user equipment is expected to be operated stationary, as it is expected to park for a certain time. Other ways of detecting to be stationary might be further employed, in particular time triggered, when no movement is detected.

Preferably the user equipment tries not only on the strongest cell to carry out a successful operation but makes a check on neighbor base stations, in particular those indicated in the SIBs of the serving base station. With that a surrounding of reliable base stations is set up and stored in the base station list maintained by the user equipment.

When now a jamming situation appears, and only a base station that is not listed in the base station list is detectable, then there is good reason for the user equipment to rate that base station as suspicious, means that this base station is with high likely hood a dummy transmitting station.

Preferably the rating of a suspicious base station is carried out by evaluating a combination of mentioned indications resp. criteria for evaluating the response behavior.

Consequently with the identification of a dummy transmitting station the user equipment knows that an attack with a jammer and a dummy transmitting station has happened. In the following it is the addressed how to cope with that finding, apart from indicating the jamming situation.

According to another preferred embodiments it is proposed that in case the jamming situation is indicated, terminating the communication with the jammed base station and the suspicious base station.

With this embodiment it is proposed means for handling the detected jamming situation. In this case, in particular when no other base station which is not rated as suspicious is detected, it is preferred to terminate communication. The communication with the jammed base station is anyhow interrupted, and trying to communicate with the suspicious base station is preferably prevented.

According to another preferred embodiment in case a jamming situation is indicated for at least one first base station, and at least one second base station is identified not being rated as suspicious, camping on said second base station.

This embodiment applies for the situation where besides the dummy transmitting station another base station is identified, that is not rated as suspicious. This means this base station is reliable, in response to of the mentioned checks. This is a quite likely situation, as the attacked who installs a jammer and a dummy transmitting station will most probably adjust the jammer that way, that it is not a wideband jammer over all addressable frequency ranges, but only selectively in order to let the dummy transmitting station unaffected. Hence base stations operating in a frequency range close to the dummy transmitting station will also be unaffected by the jammer.

Hence when such a base station is identified, the user equipment can camp on this base station. This will most likely be successful, as the base station does not answer with rejections as the dummy transmitting station does.

Preferably it is proposed that the cellular network comprising a network entity accessible by the user equipment when camping on said serving base station further comprising the step of sending a jamming indication to said network entity communicatively connected to the cellular network.

With that embodiment the user equipment additionally sends a jamming warning to a central server, which is in particular a security server, e.g. part of the cellular network.

Preferably the central server resp. its address is preconfigured and

This embodiment also encompass calling of a security center, in particular in the context of home security. When an attack with a jammer and a dummy transmitting station is detected on such an installation, there is a high likelihood that this effort is taken in order to disable the home security and carry out an intrusion. Therefore it is advantageous, if possible, to contact the security center and require security staff to the installation.

According to the second aspect of the invention it is proposed a user equipment operating in a cellular network, said cellular network comprising a plurality of base stations, the user equipment being configured to operate on at least one of the base stations, hereinafter the serving base station, for the case of a communication loss to its serving base station, whereby the conditions relating to the serving base station or the corresponding frequency fulfills the criteria concerning jamming, the user equipment is configured to:

scan for accessible base stations of the cellular network,
examine the at least one base station being identified through the scanning step, by means of signalling message,
evaluate the response behavior of said at least one base station,
wherein in consideration of the response behavior of at least one of said base station if said base station is rated as suspicious:
indicate a jamming situation,
otherwise camp on at least one of said base stations.

The user equipment provides a couple of components for conducting wireless communication. This comprises at least processing circuitry for executing operation software, in particular those implementing the method of the first aspect of the invention.

Further the user equipment comprises transmitting and receiving circuitry in connection with at least one antenna, typically a transceiver for exchanging wireless communication signals with a base station of the cellular network. Further it comprises a memory unit for volatile and/or permanent storage of executable software, configuration data and measured data e.g. before receiving the transmission from the serving base station.

The second aspect of the invention shares the advantages of the first aspect of the invention.

As it is shown this invention advantageously solves the depicted problem and suggests way to detect not only the jamming situation but also circumvention installations by means of a dummy transmitting station. In the situation of today, where for an attacker installing a jammer is not state of the art anymore, the defense ready user equipment installed in security prone environment need to employ counter-measures as the inventive method.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment UE of the type to which the present invention is applied as an embodiment. It is operating with a base station eNB1 of a cellular network CN. Base station eNB1 is the serving base station for the user equipment.

Preferably the cellular network implements at least one of the wireless cellular technology standards of 2G, 3G, 4G, 5G or beyond.

Due to the suitability of base station eNB1 the user equipment has no need to watch for other base stations in proximity of the user equipment UE, in particular when the user equipment is operating stationary.

When however the air link between the base station eNB1 and the user equipment UE is disturbed the situation has changed. The disturbance is in this exemplifying embodiment in particular caused by a jamming transmitter JT, or simply a jammer, which is in this embodiment installed close to the user equipment. A jammer is usually installed by an attacker, a person who wants to interfere the communication link of the user equipment, e.g. in order to deactivate security measures based on wireless communication techniques. A jammer is employed to emit white noise in a certain frequency range. As part of the addressed scenario it in particular only affects certain frequency ranges, in particular the one of serving base station eNB1.

However in addition to the jammer, the attacker further installs a dummy transmitting station. This is a device capable of transmitting signals, in particular a broadcast, but not envisaged to handle user equipment requests properly. The dummy transmitting station is consequently not part of cellular network CN, and is mainly designed to create for a user equipment the impression as if a regular base station is available.

For that the dummy transmitting station at least transmits a broadcast. In more elaborate implementations the dummy transmitting station moreover is capable of answering at least some requests of a user equipment.

Consequently, when the user equipment detects a loss of communication with base station eNB1, it tries to find another suitable cell. One possibility would be to be attracted by the dummy transmitting station, when the user equipment continues to believe that this is a regular base station.

In this embodiment another regular base station eNB2 is further situated close to the user equipment UE. Hence in case of a communication loss to base station eNB1 it is the goal of this exemplifying embodiment of the inventive method to enable the user equipment to camp on base station eNB2, and avoid handling with the dummy transmitting station DTS, which behaves like a base station in the first place.

Figure 1:
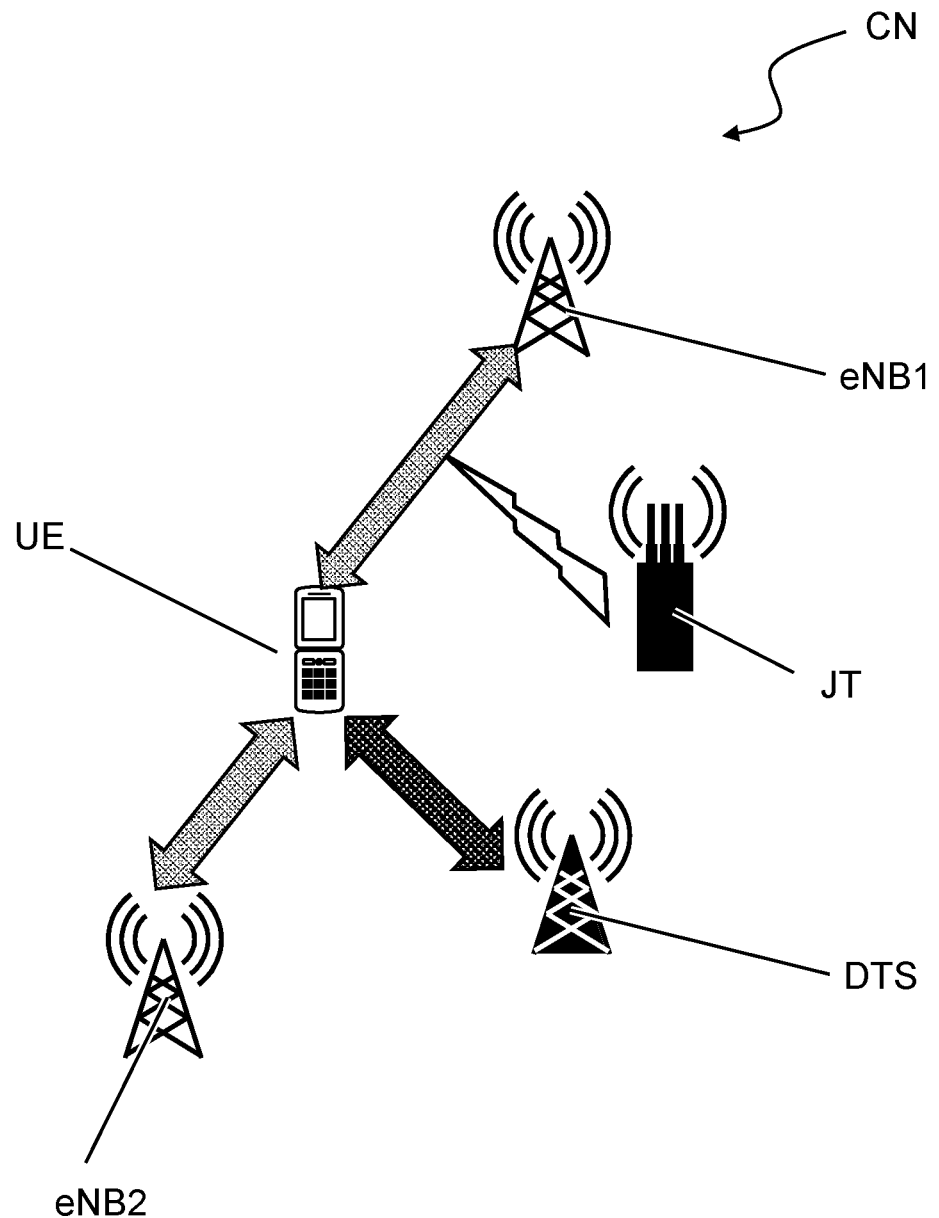
FIG. 1 represents a user equipment of the type to which the present invention is applied as an embodiment.
Figure 2:
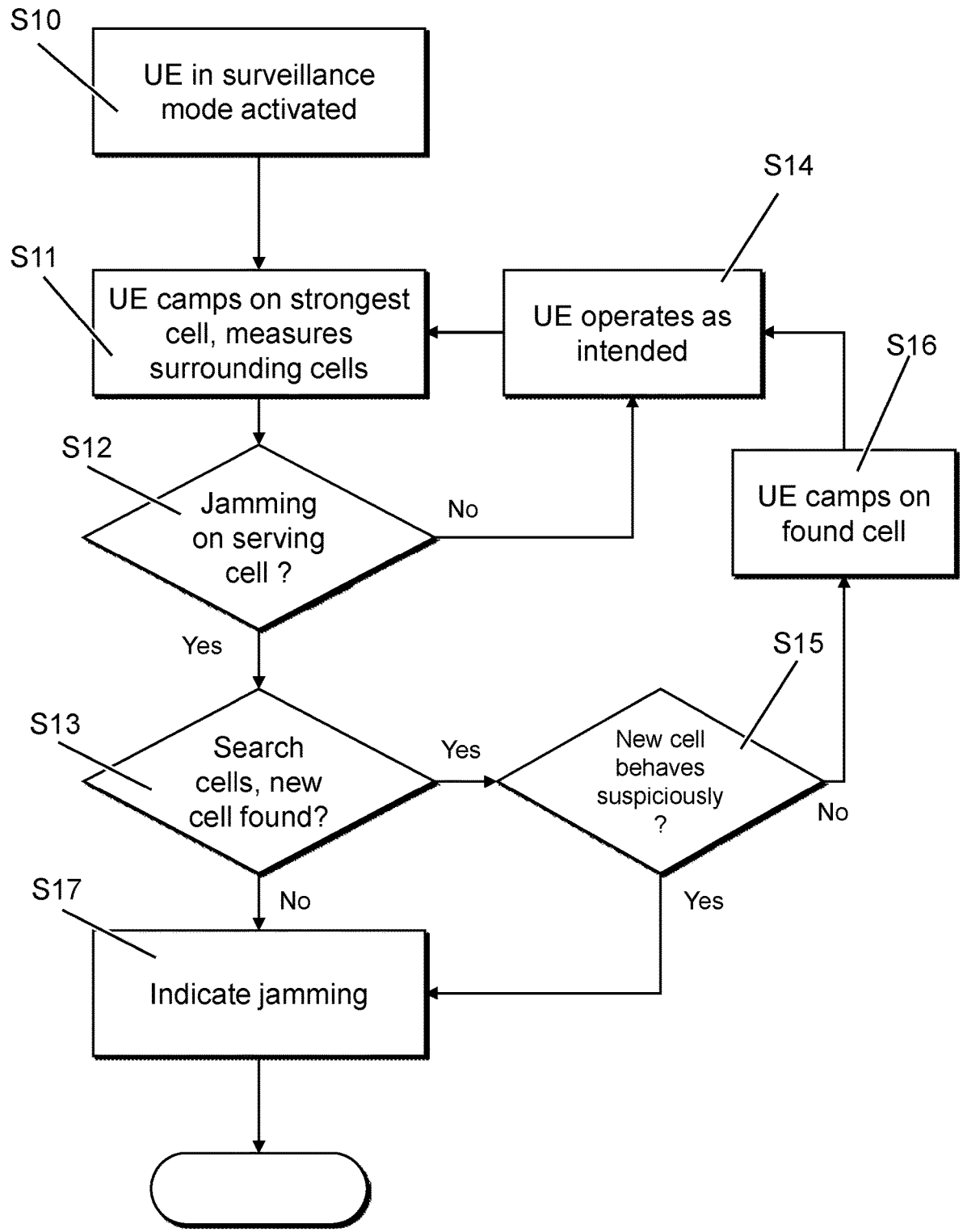
FIG. 2 shows a flow chart of an exemplifying embodiment of the inventive method.

How this is achieved, is shown in an exemplifying embodiment of the inventive method in FIG. 2.

The method starts with step S10 to put the user equipment UE in surveillance mode. This in particular applies to security installations, like home security, theft protection installations in cars etc.

Preferably such user equipments are then activated and trying to find the strongest cell as part of step S11. This is the normal process of start-up of a user equipment in a cellular network and camping and registering in a cellular network, by means of measuring signal strengths of base stations in the surrounding. The user equipment consequently camps on the strongest cell, that is the most suitable base station. Further steps of checking credentials etc. are omitted out of clarity reasons.

Preferably the monitoring of surrounding cells is continuing regularly.

Hence, after step S11 the user equipment is regularly operating with a base station of cellular network, which is by then the serving base station eNB1.

In decision step S12 it is then evaluated if a jamming situation on the serving base station has happened. This in particular relates to a communication loss. Additionally it is preferably identified it the communication loss is really due to a jamming situation. For that common procedures are available, which in particular discriminate from an out-of-service situation.

However if no such jamming has happened, then the procedure branches to step S14, that is the user equipment works as intended and is in the position to exchange data by virtue of the serving base station with another communication endpoint.

However if in step S12 a jamming situation was detected, then according to the exemplifying embodiment the user equipment carries out a new search for suitable base stations. This is in order to continue the connection with resp. registration in the cellular network.

This search in particular comprises a scan of at least parts of the available supported frequency ranges in order to figure out if another base station, which is not affected by the communication loss, and in particular not affected by the jammer, can be identified.

If this is not the case then the flow branches to step S17 and the regular jamming indication procedure is carried out, like activating a horn, switch on light or contact a service centre through another communication channel.

However should another base station be found it is the question if this base station is reliable. For that in steps S15 it is checked if the at least one identified base station behaves suspiciously.

Effectively it is hence checked if the base station is a real base station rather than a dummy transmitting station DTS.

This check comprises in particular the behaviour of the candidate base station, by means of sending a signalling message to the base station. If the base station does not answer at all, in particular repeatedly, this is a first indication for being a dummy transmitting station. Alternatively the base station may answer to the signalling message, but with reject messages. If this happens repeatedly that is another indication for being of suspicious behaviour.

Another way of figuring that out is to check, if in the broadcast indications like barring or operator use only are signalled. That would mean that no access is possible for a common user equipment. Even though base stations being restricted for operator usage exist, it is suspicious if such a base station, in particular previously not detectable, occurs just when the UE loses connection to its previous serving base station, in particular due to a situation, which is identified as jamming.

Additionally the base station list is evaluated, where it is checked if a base station is listed as reliable, and hence not behaving suspiciously.

With the combination of such checks it is consequently possible also in extreme congestion situation, like at new year's eve, to figure out if a base station is a real base station or a dummy transmitting station.

When it is figured out in step S15 if the base station is behaving suspiciously, then it is branched to step S16, if the base station behaves normally. In step S16 the user equipment camps on the found base station eNB2, which was identified as not suspicious, hence no dummy transmitting station. Hence the user equipment is expected to operate with it normally, as indicated by step S14, where the process flow continues afterwards. Certainly on this base station still it needs to be checked if jamming affects the serving base station. Additionally it is advantageous after camping on said base station to indicate the detected jamming situation.

Should in step S15 the examined base station however turn out to be a dummy transmitting station, then it is branched to step S17, as in that case a jamming situation plus a dummy transmitting station was detected. This is an attack on the user equipment and the secured object it is installed in. Hence it requires to take the necessary steps to protect the object.

It is shown, that although a decodable base station is detectable for the user equipment, still a jamming indication may be launched, which can be a regular alarm, when it is figured out that the decodable base station is in reality no real base station, but a dummy transmitting station. Hence this inventive method hardens the user equipment against enhanced attacks.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for a user equipment operating in a cellular network comprising a plurality of base stations, the user equipment operating on at least one of the base stations, hereinafter the serving base station for the case of a communication loss to its serving base station, whereby the conditions relating to the serving base station or the corresponding frequency fulfills the criteria concerning jamming, the method comprises the steps of:
scanning for accessible base stations of the cellular network,
examining the at least one base station identified through the scanning step, by means of signalling message,
evaluating the response behavior of said at least one base station,
wherein in consideration of the response behavior of at least one of said base station if said base station is rated as suspicious:
indicating a jamming situation,
otherwise camping on at least one of said base stations;
wherein rating the response behavior of a base station as suspicious comprises not answering on said signalling message.

2. Method according to claim 1, wherein said base station is rated as suspicious in case of detecting a transmission of at least one of a barring indication or a restriction for operator use indication.

3. Method according to claim 1, wherein said signalling message is a connection attempt, and rating the response behavior of a base station as suspicious comprises detecting of rejecting a plurality of connection attempts.

4. Method according to claim 1, wherein the user equipment further maintains a base station list, and the method comprising the steps of:
storing in said base station list an indication relating to a base station in conjunction with a successful operation on said base station,
wherein the evaluated base station is not rated as suspicious when the base station list contains an indication relating to said base station.

5. Method according to claim 4, wherein said step of storing indications in said base station list is triggered by an event determined by the user equipment of being momentary stationary.

6. Method according to claim 1, wherein in case the jamming situation is indicated, terminating the communication with the jammed base station and the suspicious base station.

7. Method according to claim 1, wherein in case a jamming situation is indicated for at least one first base station, and at least one second base station is identified not being rated as suspicious, camping on said second base station.

8. Method according to claim 7, the cellular network comprising a network entity accessible by the user equipment when camping on said serving base station, further comprising the step of sending a jamming indication to said network entity communicatively connected to the cellular network.

9. User equipment operating in a cellular network, said cellular network comprising a plurality of base stations, the user equipment being configured to operate on at least one of the base stations, hereinafter the serving base station, for the case of a communication loss to its serving base station, whereby the conditions relating to the serving base station or the corresponding frequency fulfills the criteria concerning jamming, the user equipment is configured to:
scan for accessible base stations of the cellular network,
examine the at least one base station being identified through the scanning step, by means of signalling message,
evaluate the response behavior of said at least one base station, wherein in consideration of the response behavior of at least one of said base station if said base station is rated as suspicious:
indicate a jamming situation,
otherwise camp on at least one of said base stations;
wherein rating the response behavior of a base station as suspicious comprises to detect not answering on said signalling message.

10. User equipment according to claim 9, wherein the user equipment is further configured to rate said base station in case of detection of a transmission of at least one of a barring indication or a restriction for operator use indication.

11. User equipment according to claim 9, wherein said signalling message is a connection attempt, and rating the response behavior of a base station as suspicious comprises to detect rejecting a plurality of connection attempts.

12. User equipment according to claim 9, further configured to maintain a base station list, and the user equipment is further configured to:
store in said base station list an indication relating to a base station in conjunction with a successful operation on said base station,
wherein the evaluated base station is not rated as suspicious when the base station list contains an indication relating to said base station.

13. User equipment according to claim 12, further configured to determine of being momentary stationary, wherein said storing of said indications in said base station list is triggered by said determination.

* * * * *